US009386626B1

(12) United States Patent
Hsu et al.

(10) Patent No.: US 9,386,626 B1
(45) Date of Patent: Jul. 5, 2016

(54) IDLE MODE OPERATIONS IN MULTI-SUBSCRIBER IDENTITY MODULE (SIM) MOBILE COMMUNICATION DEVICES DURING A VOICE CALL

(71) Applicant: QUALCOMM Incorporated, San Diego, CA (US)

(72) Inventors: Chih-Ping Hsu, San Diego, CA (US); Parthasarathy Krishnamoorthy, San Diego, CA (US); Anand Rajurkar, Hyderabad (IN); Reza Shahidi, San Diego, CA (US)

( * ) Notice: Subject to any disclaimer, the term of this patent is extended or adjusted under 35 U.S.C. 154(b) by 0 days.

(21) Appl. No.: 14/721,105

(22) Filed: May 26, 2015

(51) Int. Cl.
*H04W 76/04* (2009.01)
*H04J 13/00* (2011.01)

(52) U.S. Cl.
CPC ............ *H04W 76/048* (2013.01); *H04J 13/00* (2013.01)

(58) Field of Classification Search
CPC . H04W 76/048; H04W 76/04; H04W 76/041; H04W 76/045; H04W 76/06; H04W 76/064; H04W 76/066; H04J 3/00
USPC .............................................. 455/450, 452.1
See application file for complete search history.

(56) References Cited

U.S. PATENT DOCUMENTS

| 8,121,601 | B2 | 2/2012 | Huang et al. | |
|---|---|---|---|---|
| 8,195,234 | B2 * | 6/2012 | Chang | H04M 1/72519 370/310 |
| 8,688,122 | B2 | 4/2014 | Mutya et al. | |
| 8,798,619 | B2 | 8/2014 | Narang et al. | |
| 8,805,444 | B2 | 8/2014 | Han et al. | |
| 8,862,127 | B2 * | 10/2014 | Shin | H04W 48/16 379/114.03 |
| 8,892,137 | B2 | 11/2014 | Hanchate et al. | |
| 2010/0279698 | A1 | 11/2010 | Wong | |
| 2011/0217969 | A1 | 9/2011 | Spartz et al. | |
| 2012/0178402 | A1 | 7/2012 | Krishnamoorthy et al. | |
| 2013/0244660 | A1 | 9/2013 | Kumar et al. | |
| 2013/0295920 | A1 * | 11/2013 | Viswanadham | H04W 36/14 455/426.1 |
| 2013/0337850 | A1 | 12/2013 | Ljung | |
| 2014/0120925 | A1 | 5/2014 | Kanthala et al. | |
| 2015/0141012 | A1 * | 5/2015 | Ramkumar | H04W 52/0209 455/435.3 |
| 2015/0325213 | A1 * | 11/2015 | Lee | G09G 5/18 345/213 |

FOREIGN PATENT DOCUMENTS

JP  4706919 B2  6/2011

* cited by examiner

*Primary Examiner* — Siu Lee
(74) *Attorney, Agent, or Firm* — Qualcomm IP Dept.; James Hunt Yancey, Jr.

(57) ABSTRACT

Various embodiments include methods implemented on a mobile communication device for sharing network information among subscriptions when a first subscription is in a voice call and a second subscription is in an idle mode. The methods may include determining whether the first subscription and the second subscription share a network operator and are camped on a same base station. If so, the first subscription may receive network information from the base station and store the network information in a shared memory of the mobile communication device that can be accessed by the second subscription. The second subscription may then perform some idle mode operations using the network information stored in the shared memory.

25 Claims, 10 Drawing Sheets

US 9,386,626 B1

IDLE MODE OPERATIONS IN MULTI-SUBSCRIBER IDENTITY MODULE (SIM) MOBILE COMMUNICATION DEVICES DURING A VOICE CALL

BACKGROUND

Some designs of mobile communication devices—such as smart phones, tablet computers, and laptop computers—contain one or more Subscriber Identity Module (SIM) cards that provide users with access to multiple separate mobile telephony networks. Examples of mobile telephony networks include Third Generation (3G), Fourth Generation (4G), Long Term Evolution (LTE), Time Division Multiple Access (TDMA), Code Division Multiple Access (CDMA), Wideband CDMA (WCDMA), Global System for Mobile Communications (GSM), and Universal Mobile Telecommunications Systems (UMTS). A mobile communication device that includes one or more SIMs and connects to two or more separate mobile telephony networks using one or more shared radio frequency (RF) resources/radios is termed a multi-SIM mobile communication device. One example is a multi-SIM-multi-standby (MSMS) communication device, which includes two or more SIM cards/subscriptions that are each associated with a separate radio access technology (RAT), and the separate RATs share one RF chain to communicate with two or more separate mobile telephony networks on behalf of each RAT's respective subscription.

When none of the RATs, or subscriptions supported by the RATs, in a multi-SIM mobile communication device is actively communicating with a network, each subscription enters idle mode. In the idle mode, a subscription repeats a discontinuous reception (DRx) cycle, each cycle lasting for a predetermined amount of time. During each DRx cycle, the subscription is not communicating with the network. At the end of each cycle, the subscription performs an idle mode wakeup, which means the subscription temporarily resumes contact with the network to receive network information before beginning the next DRx cycle. This network information is used to perform idle mode operations that allow the subscription to remain synchronized with the network. The network information obtained from the network may include, but is not limited to, system information blocks, sample RAM values, and neighbor cell measurements. Idle mode operations may include, but are not limited to, reception automatic gain control computations, cell reacquisition operations, finger triage operations, quick finger tracking or quick time tracking operations, equalizer weight computations, page indicator channel monitoring operations, selection criteria and reselection criteria evaluations, inter- and intra-frequency neighbor measurements, decoding of system information blocks, antenna switch diversity algorithms, and idle diversity operations. For a multi-SIM mobile communication device in which all subscriptions are in the idle mode, each subscription performs an idle mode wakeup to acquire network information from each subscription's respective network, and performs idle mode operations using the acquired network information.

When one subscription is used to make a voice call, for example a circuit switched call, the subscription leaves idle mode and enters an active mode in which the subscription is in communication with a network. While one subscription is in the active mode the other subscriptions remain in the idle mode. Because a voice call has a higher priority than an idle mode wakeup, the idle subscriptions cannot interrupt the voice call to perform an idle mode wakeup with each subscription's respective network through the shared RF resource. This may result in the idle subscriptions going into out-of-service status as the idle subscriptions are no longer synchronized with each subscription's respective network. Once the voice call ends, each of the idle subscriptions may undergo a full network search to reconnect with each subscription's respective network. This full network search may consume a large amount of device resources and power, and may take a relatively long time to perform.

In another situation, one subscription may leave idle mode to engage in active data communication with a network while the other subscriptions remain in the idle mode. However, the idle subscriptions may periodically interrupt the active subscription's data communication to perform idle mode wakeup using the shared RF resource. This process of switching access of the shared RF resource from an active subscription to an idle subscription is sometimes referred to as a "tune-away" because the RF resource tunes away from the active subscription's frequency band or channel and tunes to the idle subscription's frequency bands or channels. After the idle subscription has finished network communications during the idle mode wakeup, access to the RF resource may switch from the idle subscription to the active subscription via a "tune-back" operation. A tune-away interrupts the active subscription's data communication, which may result in the loss or degradation of data.

For multi-SIM mobile communication devices, more than one subscription may sometimes be connected to the same network operator and the subscriptions may connect to the same base station used by the network operator. In this situation, the network information that is received from the network during idle mode wakeup is the same for all subscriptions that share the same network operator and base station. In addition, because idle mode operations are conducted using the network information, the results of the idle mode operations may be the same for all subscriptions. However, because each subscription conducts idle mode wakeup and idle mode operations independently, there may be duplicative communications with the network base station and duplicative performance of idle mode operations. The independent idle mode activities of each subscription may collectively consume a large amount of device resource and power. In addition, problems arise when the idle mode activities of idle subscriptions interfere with an active subscription in a voice call (out-of-service status for idle subscriptions) or in data communication (tune-aways to the idle subscriptions degrade data communication).

SUMMARY

Various embodiments include methods implemented on a mobile communication device for sharing network information among subscriptions when a first subscription is in a voice call and a second subscription is in an idle mode. Various embodiment methods may include determining whether the first subscription and the second subscription share a network operator and are camped on a same base station, receiving network information from the base station using the first subscription, storing the network information in a shared memory (e.g., a static random access memory) of the mobile communication device in response to determining that the first subscription and the second subscription share a network operator and are camped on the same base station, and performing idle mode operations for the second subscription using the network information stored in the shared memory. In some embodiments, the first subscription and the second subscription may both be WCDMA subscriptions. In some embodiments, the network information may include at least one of a system information block, a sample RAM value, and a neighbor cell measurement. In some embodiments, the idle mode operations may include at least one of a reception automatic gain control computation, a cell reacquisition operation, a finger triage operation, a quick finger tracking operation, a quick time tracking operation, an equalizer weight computation, a page indicator channel monitoring operation, a selection criteria evaluation, a reselection criteria evaluation, an inter-frequency neighbor measurement, an intra-frequency neighbor measurement, a decoding of a system information block, an antenna switch diversity algorithm, and an idle diversity operation. Some embodiments may further include setting an out-of-service status on the second subscription in response to determining the first subscription and the second subscription do not share the same network operator or are camped on different base stations.

In some embodiments, determining whether the first subscription and the second subscription share the same network operator and are camped on a same base station may include comparing network identifier information of the first subscription with network identifier information of the second subscription. In such embodiments, the network identifier information may include at least one of an international mobile subscriber identity, a temporary mobile subscriber identity, a public land mobile network identifier, and an absolute radio frequency channel number.

Further embodiments include a computing device including a processor configured with processor-executable instructions to perform operations of the embodiment methods described above. Further embodiments include a non-transitory processor-readable storage medium having stored thereon processor-executable software instructions configured to cause a processor to perform operations of the embodiment methods described above. Further embodiments include a computing device that includes means for performing functions of the operations of the embodiment methods described above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the disclosed systems and methods.

DETAILED DESCRIPTION

Figure 1:
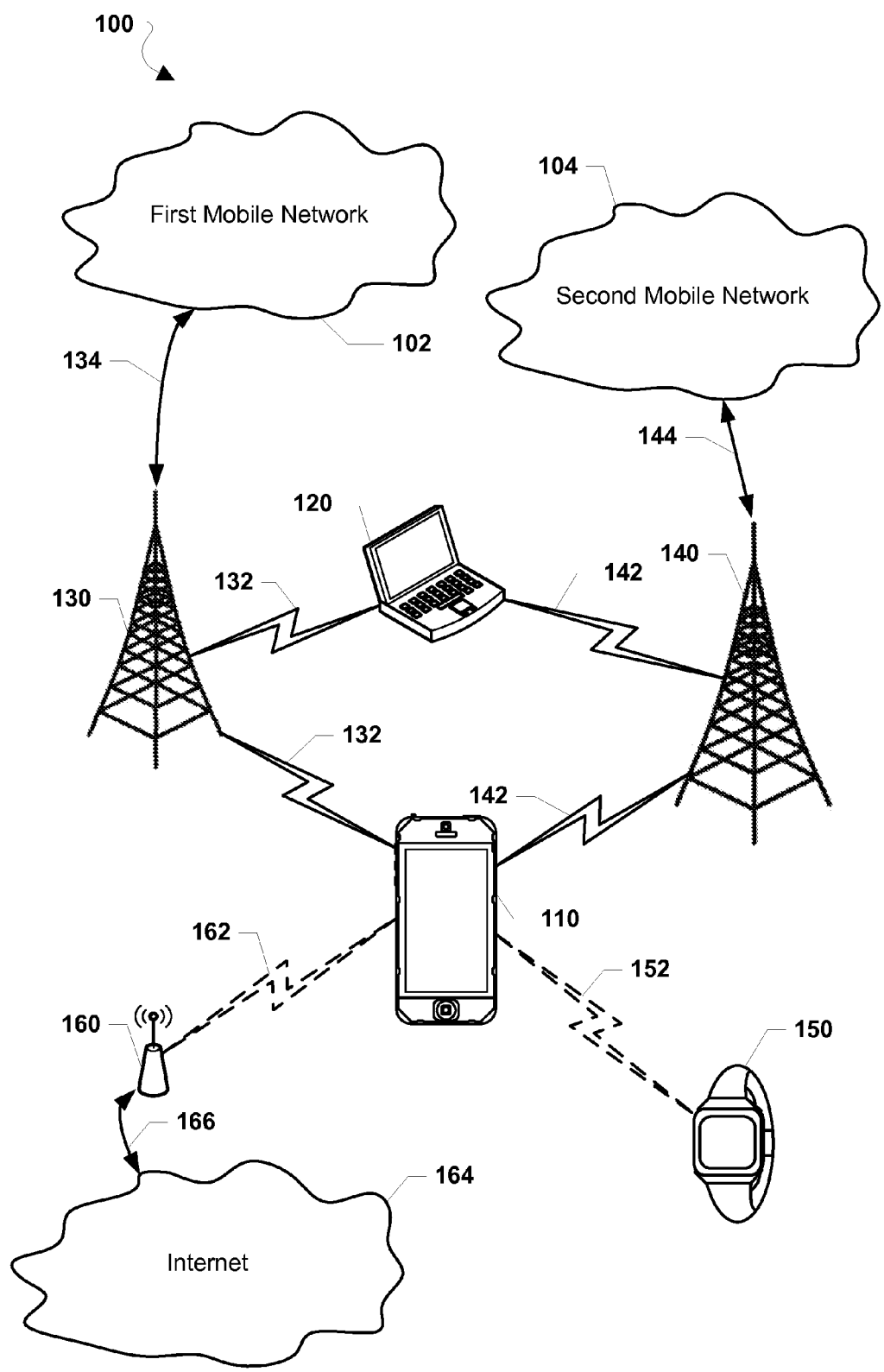
FIG. 1 is a communication system block diagram of mobile telephony networks suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the written description or the claims.

As used herein, the term "multi-SIM mobile communication device" or "multi-SIM device" refers to any one or all of cellular telephones, smart phones, personal or mobile multimedia players, personal data assistants, laptop computers, tablet computers, smart books, palm-top computers, wireless electronic mail receivers, multimedia Internet-enabled cellular telephones, wireless gaming controllers, and similar personal electronic devices that includes one or more SIM cards, a programmable processor, memory, and circuitry for connecting to at least two mobile communication network with one or more shared RF resources. Various embodiments may be useful in mobile communication devices, such as smart phones, and so such devices are referred to in the descriptions of various embodiments. However, the embodiments may be useful in any electronic devices that may individually maintain a plurality of RATs/subscriptions that utilize at least one shared RF chain, which may include one or more of antennae, radios, transceivers, etc. Multi-SIM mobile communication devices may be configured to operate in MSMS mode.

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, and/or other information used to identify and/or authenticate a multi-standby communication device on a network and enable a communication service with the network. Because the information stored in a SIM enables the multi-SIM mobile communication device to establish a communication link for a particular communication service with a particular network, the term "subscription" is used herein as a shorthand reference to refer to the communication service associated with and enabled by the information stored in a particular SIM as the SIM and the communication network, as well as the services and subscriptions supported by that network, correlate to one another.

In a multi-SIM mobile communication device, two or more RATs may function on the same device. For example, a dual-SIM device may support both WCDMA and GSM technologies, or both RATs may support WCDMA technology. The dual-SIM mobile communication may be configured as a dual-SIM dual-standby (DSDS) device, meaning that both RATs share one RF resource and only one RAT may be active at any one time, with the other RAT in the idle mode. Generally, a multi-SIM multi-standby (MSMS) device has two or more RATs, all of which share one RF resource and only one RAT may be active at any one time, with the other RATs in the idle mode.

In a multi-SIM mobile communication device, for example a DSDS device, when no subscription is active, the subscriptions that are synched with a network are in the idle mode. Each idle subscription goes through successive discontinuous reception (DRx) cycles. Between each DRx cycle, an idle subscription conducts an idle mode wakeup in which the subscription temporarily contacts the network and receives network information. This network information is used by the subscription to conduct idle mode operations, which may be operations used to maintain synchronization with the network, set internal data values, or other operations usually conducted while in the idle mode. Each subscription conducts idle mode activities independently, even though both subscriptions may share the same network operator and are in communication with, or camped on, the same base station.

When one subscription enters a voice call, for example a circuit switched call, the subscription leaves the idle mode and connects with the network. The other idle subscription then cannot interrupt the voice call to conduct the idle mode wakeup, and so loses synchronization with the network. This situation results in the idle subscription going into an out-of-service status, and when the voice call ends, the idle subscription conducts a full network search to reconnect with the network.

When one subscription enters data communications, the subscription also leaves the idle mode and connects with the network. However, in contrast to the situation when a voice call starts, the idle subscription may still connect to the network supporting the idle subscription in order to conduct an idle mode wakeup using a tune-away. This situation results in the shared RF resource of the multi-SIM mobile communication device tuning away from the active subscription to the idle subscription. Tune-aways may result in the loss or degradation of data quality on the data communication.

In some instances, both subscriptions in a multi-SIM mobile communication device may share the same network operator and are in communication with or camped on the same base station. For example, both subscriptions in a DSDS device may use the same WCDMA network operator, and because both subscriptions are located in the same device, the closest base station for both subscriptions is the same base station. In this situation, network information obtained from the base station is the same for both subscriptions. When this is the case, improvements may be made to the way idle mode operations are conducted.

In overview, various embodiments provide methods implemented with a processor of a mobile communication device (e.g., a multi-SIM mobile communication device) that improve idle mode operations in the mobile communication device when all the subscriptions are in the idle mode and camped on the same base station by sharing network information obtained from the base station. In various embodiments, a processor of the mobile communication device may determine whether a first subscription and a second subscription on the mobile communication device share the same network operator and are camped on the same base station.

When the first and second subscriptions share the same network operator, are camped on the same base station, and are in the idle mode, the subscription that first conducts an idle mode wakeup may obtain network information from the base station. In response to determining that both subscriptions share the same network operator and base station, the network information obtained from the base station may be stored in a shared memory on the mobile communication device accessible to the other subscription. Both subscriptions may then perform idle mode operations using the network information stored in the shared memory. Thus the subscription that did not conduct an idle mode wakeup may perform idle mode operations by using the network information collected by the subscription that did conduct an idle mode wakeup. This means that while both subscriptions are in the idle mode, only one subscription needs to contact the base station during an idle mode wakeup. This reduces duplicative communications with the network and reduces the amount of resources and power used on the device. In addition, one or more idle mode operations performed by the subscription that conducted the idle mode wakeup may be used as the results for one or more idle mode operations of the non-waking subscription. This prevents duplicative performance of idle mode operations when the result is the same for both subscriptions. This method is also applicable to mobile communication devices with more than two subscriptions when two or more subscriptions share the same network operator and base station.

When the first and second subscriptions share the same network operator, are camped on the same base station, and one subscription initiates or receives a voice call, thus entering a high priority active mode, the other subscription remains in the idle mode. In response to determining that both subscriptions share the same network operator and base station, the active subscription in the voice call obtains the network information from the base station, and the network information may be stored in a shared memory on the mobile communication device accessible to the idle subscription. The idle subscription may then perform idle mode operations using the network information stored in the shared memory. This allows the idle subscription to stay synchronized with the network and avoids having the idle subscription go to out-of-service (OOS) status. Once the voice call ends and the active subscription reverts back to idle mode, and either subscription may conduct an idle mode wakeup and store network information to the shared memory as described.

When the first and second subscriptions share the same network operator, are camped on the same base station, and one subscription initiates or receives data communications, the other subscription remains in the idle mode. In response to determining that both subscriptions share the same network operator and base station, the active subscription in the data communication obtains the network information from the base station, and the network information may be stored in a shared memory on the mobile communication device accessible to the idle subscription. The idle subscription may then perform idle mode operations using the network information stored in the shared memory. This allows the idle subscription to perform idle mode operations without having the mobile communication device tune-away from the active subscription to the idle subscription to conduct the idle mode wakeup. When the data communication ends, the active subscription reverts back to idle mode, and either subscription may conduct an idle mode wakeup and store network information to the shared memory as described. If the idle subscription initiates or receives a voice call during the data communication on the active subscription, the active and idle states of the subscriptions switch, and the previously idle subscription that becomes the active subscription for the duration of the call may obtain the network information from the base station and store the network information in the shared memory as described.

Various embodiments may be implemented within a variety of communication systems 100, such as at least two mobile telephony networks, an example of which is illustrated in FIG. 1. A first mobile network 102 and a second mobile network 104 typically each include a plurality of cellular base stations (e.g., a first base station 130 and a second base station 140). A first multi-SIM mobile communication device 110 may be in communication with the first mobile network 102 through a cellular connection 132 to the first base station 130. The first multi-SIM mobile communication device 110 may also be in communication with the second mobile network 104 through a cellular connection 142 to the second base station 140. The first base station 130 may be in communication with the first mobile network 102 over a wired connection 134. The second base station 140 may be in communication with the second mobile network 104 over a wired connection 144.

A second multi-SIM mobile communication device 120 may similarly communicate with the first mobile network 102 through the cellular connection 132 to the first base station 130. The second multi-SIM mobile communication device 120 may also communicate with the second mobile network 104 through the cellular connection 142 to the second base station 140. The cellular connections 132 and 142 may be made through two-way wireless communication links, such as Third Generation (3G), Fourth Generation (4G), Long Term Evolution (LTE), Time Division Multiple Access (TDMA), Code Division Multiple Access (CDMA), Wideband CDMA (WCDMA), Global System for Mobile Communications (GSM), Universal Mobile Telecommunications Systems (UMTS), and other mobile telephony communication technologies.

While the multi-SIM mobile communication devices 110, 120 are shown connected to the first mobile network 102 and, optionally, to the second mobile network 104, in some embodiments (not shown), the multi-SIM mobile communication devices 110, 120 may include two or more subscriptions to two or more mobile networks and may connect to those subscriptions in a manner similar to those described above.

In some embodiments, the first multi-SIM mobile communication device 110 may optionally establish a wireless connection 152 with a peripheral device 150 used in connection with the first multi-SIM mobile communication device 110. For example, the first multi-SIM mobile communication device 110 may communicate over a Bluetooth® link with a Bluetooth-enabled personal computing device (e.g., a "smart watch"). In some embodiments, the first multi-SIM mobile communication device 110 may optionally establish a wireless connection 162 with a wireless access point 160, such as over a Wi-Fi connection. The wireless access point 160 may be configured to connect to the Internet 164 or another network over a wired connection 166.

While not illustrated, the second multi-SIM mobile communication device 120 may similarly be configured to connect with the peripheral device 150 and/or the wireless access point 160 over wireless links.

Figure 2:
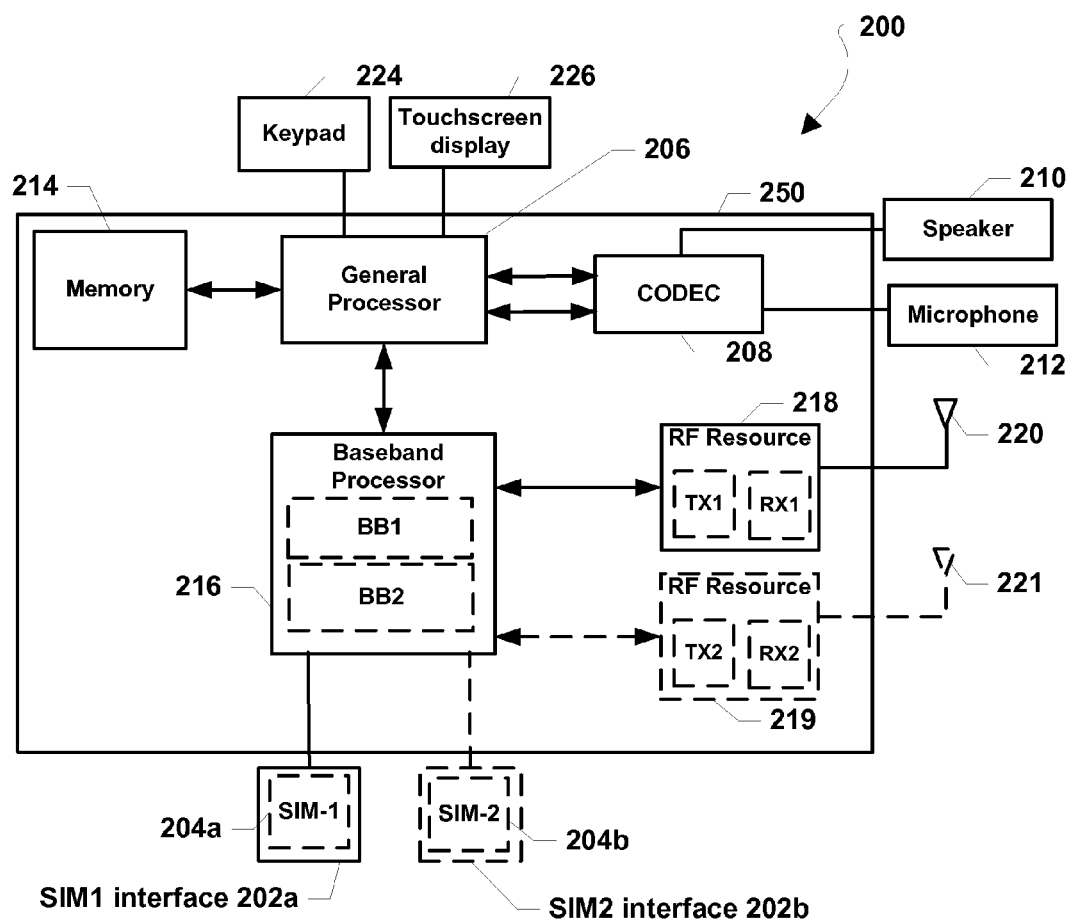
FIG. 2 is a component block diagram of a multi-SIM mobile communication device according to various embodiments.

FIG. 2 is a functional block diagram of a multi-SIM mobile communication device 200 suitable for implementing various embodiments. With reference to FIGS. 1-2, the multi-SIM mobile communication device 200 may be similar to one or more of the multi-SIM mobile communication devices 110, 120 as described. The multi-SIM mobile communication device 200 may include a first SIM interface 202a, which may receive a first identity module SIM-1 204a that is associated with a first subscription. The multi-SIM mobile communication device 200 may also optionally include a second SIM interface 202b, which may receive an optional second identity module SIM-2 204b that is associated with a second subscription.

A SIM in various embodiments may be a Universal Integrated Circuit Card (UICC) that is configured with SIM and/or Universal SIM applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. A SIM card may have a central processing unit (CPU), read only memory (ROM), random access memory (RAM), electrically erasable programmable read only memory (EEPROM) and input/output (I/O) circuits.

A SIM used in various embodiments may contain user account information, an international mobile subscriber identity (IMSI), a set of SIM application toolkit (SAT) commands, and storage space for phone book contacts. A SIM card may further store home identifiers (e.g., a System Identification Number (SID)/Network Identification Number (NID) pair, a Home Public Land Mobile Number (HPLMN) code, etc.) to indicate the SIM card network operator provider. An Integrated Circuit Card Identity (ICCID) SIM serial number may be printed on the SIM card for identification. However, a SIM may be implemented within a portion of memory of the multi-SIM mobile communication device 200 (e.g., in a memory 214), and thus need not be a separate or removable circuit, chip or card.

The multi-SIM mobile communication device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to the memory 214. The memory 214 may be a non-transitory computer-readable storage medium that stores processor-executable instructions. For example, the instructions may include routing communication data relating to the first or second subscription though a corresponding baseband-RF resource chain.

The memory 214 may store an operating system (OS), as well as user application software and executable instructions. The memory 214 may also store application data, such as an array data structure. The memory 214 may also store network information obtained by the SIM-1 204a or the SIM-2 204b during an idle mode wakeup. This network information is accessible by both the SIM-1 204a and the SIM-2 204b to use in performing idle mode operations. For example, the memory 214 may include a static random access memory (SRAM) component that stores sample values obtained from the network as part of the network information.

The general processor 206 and the memory 214 may each be coupled to at least one baseband modem processor 216.

Each SIM and/or RAT in the multi-SIM mobile communication device 200 (e.g., the SIM-1 204a and/or the SIM-2 204b) may be associated with a baseband-RF resource chain. A baseband-RF resource chain may include the baseband modem processor 216, which may perform baseband/modem functions for communications with/controlling a RAT, and may include one or more amplifiers and radios, referred to generally herein as RF resources (e.g., RF resource 218, 219). In some embodiments, baseband-RF resource chains may share the baseband modem processor 216 (i.e., a single device that performs baseband/modem functions for all RATs on the multi-SIM mobile communication device 200). In other embodiments, each baseband-RF resource chain may include physically or logically separate baseband processors (e.g., BB1, BB2).

The RF resource 218 may be a transceiver that performs transmit/receive functions for each of the SIMs/RATs on the multi-SIM mobile communication device 200. The RF resource 218 may include separate transmit and receive circuitry, or may include a transceiver that combines transmitter and receiver functions. In some embodiments, the RF resource 218 may include multiple receive circuitries. The RF resource 218 may be coupled to a wireless antenna (e.g., a wireless antenna 220). The RF resource 218 may also be coupled to the baseband modem processor 216. In some optional embodiments, the multi-SIM mobile communication device 200 may include an optional RF resource 219 configured similarly to the RF resource 218 and coupled to an optional wireless antenna 221.

In some embodiments, the general processor 206, the memory 214, the baseband processor(s) 216, and the RF resources 218, 219 may be included in the multi-SIM mobile communication device 200 as a system-on-chip 250. In some embodiments, the first and second SIMs 204a, 204b and the corresponding interfaces 202a, 202b to each subscription may be external to the system-on-chip 250. Further, various input and output devices may be coupled to components on the system-on-chip 250, such as interfaces or controllers. Example user input components suitable for use in the multi-SIM mobile communication device 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in the multi-SIM mobile communication device 200 to enable communication between them, as is known in the art.

Functioning together, the two SIMs 204a, 204b, the baseband processor BB1, BB2, the RF resources 218, 219, and the wireless antennas 220, 221 may constitute two or more radio access technologies (RATs). For example, the multi-SIM mobile communication device 200 may be a SRLTE communication device that includes a SIM, baseband processor, and RF resource configured to support two different RATs, such as LTE, WCDMA, and GSM. More RATs may be supported on the multi-SIM mobile communication device 200 by adding more SIM cards, SIM interfaces, RF resources, and antennae for connecting to additional mobile networks.

In some embodiments (not shown), the multi-SIM mobile communication device 200 may include, among other things, additional SIM cards, SIM interfaces, a plurality of RF resources associated with the additional SIM cards, and additional antennae for supporting subscriptions communications with additional mobile networks.

Figure 3:
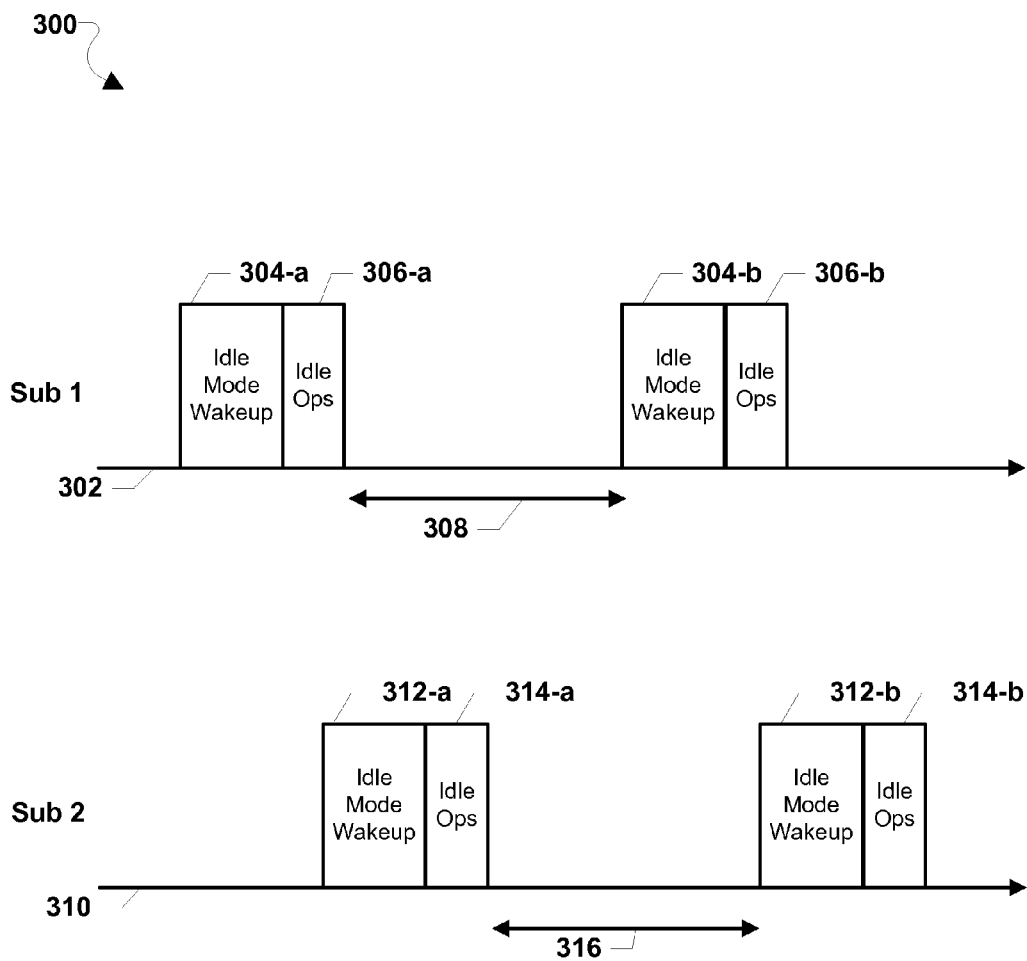
FIG. 3 is a timing diagram illustrating regular idle mode operations when both subscriptions are in the idle mode in a multi-SIM mobile communication device.

FIG. 3 illustrates a timing diagram 300 for a multi-SIM mobile communication device with at least two subscriptions according to conventional methods. The multi-SIM mobile communication device may be a DSDS device, and both subscriptions may be WCDMA subscriptions. In the example illustrated in FIG. 3, the first subscription 302 and the second subscription 310 are both in the idle mode, which means that neither subscription is in active communication with a network in a voice or data transfer. Subscriptions in the idle mode are subject to repeated discontinuous reception (DRx) cycles in which the subscription and the network are not in contact with each other. The first subscription 302 has a DRx cycle 308 while the second subscription has a DRx cycle 316.

Between each DRx cycle, a subscription performs an idle mode wakeup. For example, the first subscription 302 performs an idle mode wakeup 304-a before the beginning of the DRx cycle 308, and then performs another idle mode wakeup 304-b after the end of DRx cycle 308. During the idle mode wakeups 304-a and 304-b, the first subscription 302 is in communication with the network supporting the first subscription through a base station and acquires network information. Likewise, the second subscription 310 performs an idle mode wakeup 312-a before the beginning of the DRx cycle 316, and then performs another idle mode wakeup 312-b after the end of DRx cycle 316. During the idle mode wakeups 312-a and 312-b, the second subscription 310 is in communication with the network supporting the second subscription through a base station and acquires network information.

The network information acquired by a subscription from the network may include, but is not limited to, system block information, sample RAM values, and neighbor cell measurements. The first subscription 302 and the second subscription 310 may share the same network operator and communicate with the same base station, in which case the network information acquired is the same for both subscriptions. If the first subscription 302 and the second subscription 310 do not share the same network operator, or do not communicate with the same base station, or do not have the same RAT, the network information acquired is different for each subscription.

Once the first subscription 302 acquires network information during idle mode wakeups 304-a and 304-b, the first subscription 302 performs idle mode operations 306-a and 306-b respectively using the acquired network information. Idle mode operations are calculations, determinations, or other operations used by the first subscription 302 to maintain the idle mode status and remain synchronized to the network and base station. Idle mode operations may include, but are not limited to, reception automatic gain control computations, cell reacquisition operations, finger triage operations (i.e., pilot finger positioning), quick finger tracking or quick time tracking operations, equalizer weight computations, page indicator channel monitoring operations (e.g., reading corresponding page indicator bits to determine information about incoming pages), selection criteria (S-criteria) and reselection criteria (R-criteria evaluations), inter- and intra-frequency neighbor measurements, decoding of system information blocks, antenna switch diversity algorithms (e.g., an algorithm that helps determine the antenna to be used upon wake-up for better page reception), and idle diversity operations (e.g., determining whether a diversity antenna needs to be enabled along with primary antenna for efficient page reception, when signal levels are too low/weak, etc.).

Likewise, once the second subscription 310 acquires network information during idle mode wakeups 312-*a* and 312-*b*, the second subscription 310 performs idle mode operations 314-*a* and 314-*b* respectively using the acquired network information. The idle mode operations for both subscriptions may be performed as part of the idle-mode wakeup phase. Thus, the timing diagram 300 illustrates two subscriptions operating in the idle mode.

If the first subscription 302 and the second subscription 310 share the same network operator and communicate with the same base station, the network information acquired during idle mode wakeup phases is the same. This results in duplicative communication with the network to acquire network information, Moreover, if the idle mode wakeups of both subscriptions overlap it may also result in duplicative performance of idle mode operations because the operations are based on the same network information (some idle mode operations may be time dependent, and thus would be different if the idle mode wakeups of both subscriptions do not overlap). Performing an idle mode wakeup and the idle mode operations may consume a large amount of device resources (e.g., CPU time, memory, battery power), and so when both subscriptions share the same network operator and base station these duplicative operations may be reduced.

Figure 4:
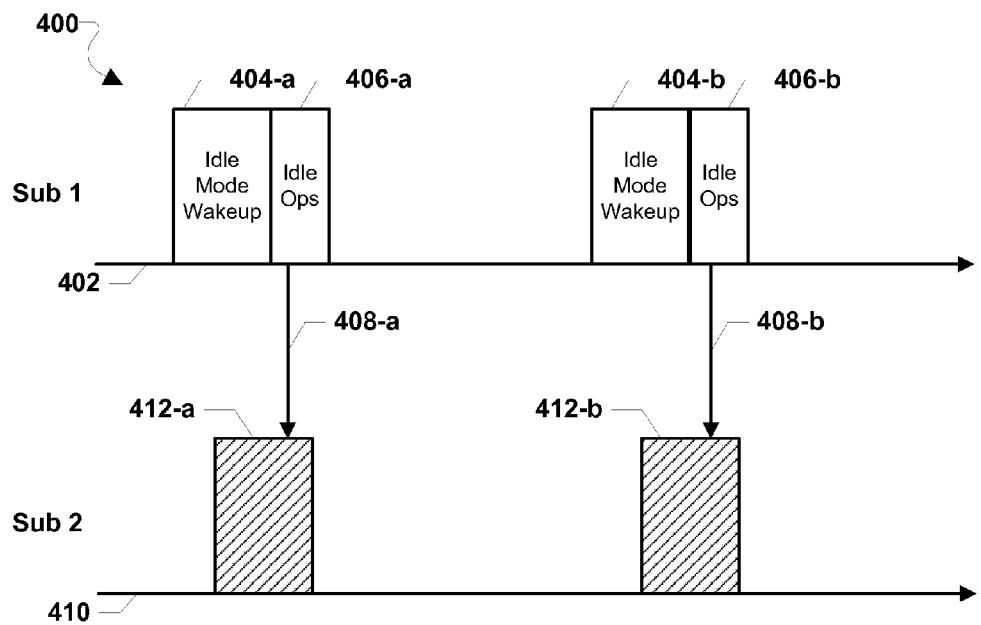
FIG. 4 is a timing diagram illustrating improved idle mode operations when both subscriptions are in the idle mode with overlapping idle mode wakeup according to various embodiments.
Figure 5:
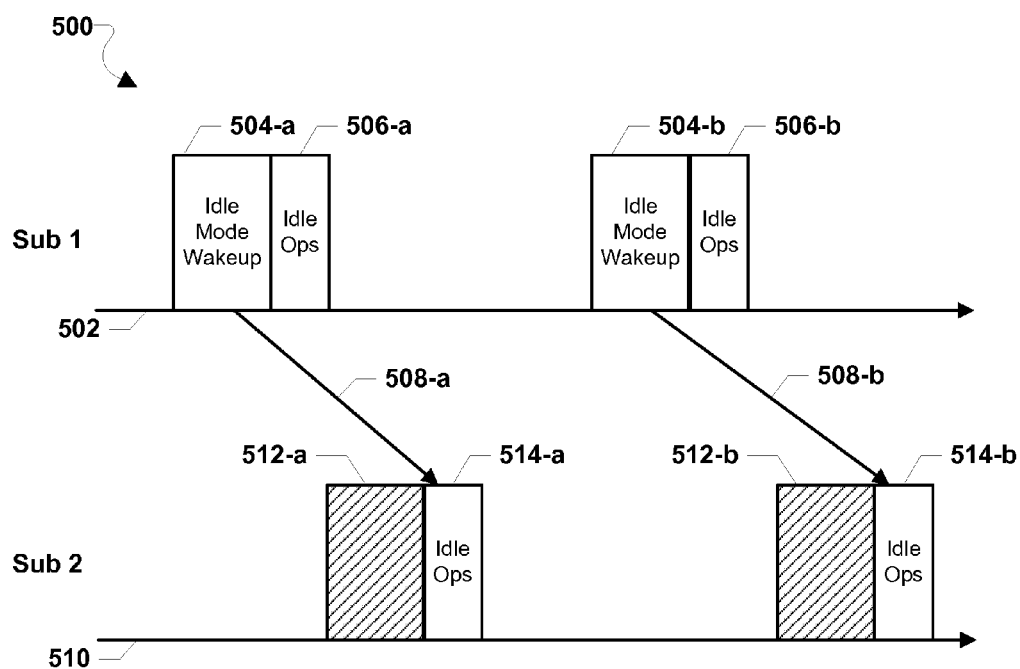
FIG. 5 is a timing diagram illustrating improved idle mode operations when both subscriptions are in the idle mode without overlapping idle mode wakeup according to various embodiments.

FIGS. 4 and 5 are timing diagrams illustrating sharing network information between subscription according to various embodiments in order to improve idle mode operations of a multi-SIM mobile communication device in which two subscriptions are in the idle mode and share the same network operator and base station. FIG. 4 illustrates the sharing of network information when the idle mode wakeups of both subscriptions overlap according to an embodiment, while FIG. 5 illustrates the sharing of network information when the idle mode wakeups of both subscriptions do not overlap according to an embodiment.

FIG. 4 shows a timing diagram 400 for a multi-SIM mobile communication device with a first subscription 402 in the idle mode and a second subscription 410 in the idle mode in which both subscriptions share the same network operator and base station. With reference to FIGS. 1, 2, and 4, in the example illustrated in the timing diagram 400, the first subscription 402 wakes up from idle mode before the second subscription 410. The first subscription 402 performs an idle mode wakeup 404-*a* while in the idle mode, and acquires network information from the base station during the idle mode wakeup 404-*a*. The first subscription 402 then performs idle mode operations 406-*a* after acquiring the network information. The first subscription 402 then remains idle during the next DRx cycle, and performs another idle mode wakeup 404-*b* at the end of the DRx cycle to obtain network information from the base station. The first subscription then performs idle mode operations 406-*b* before going back into a DRx cycle. The network information may be stored in memory on the multi-SIM mobile communication device (e.g., 200) that is accessible by both subscriptions, for example the memory 214. Additionally, the results of the idle mode operations 406-*a* and 406-*b* may be stored in memory accessible by both subscriptions.

In the illustrated example, the second subscription 410 is scheduled to perform idle mode wakeups 412-*a* and 412-*b*, which overlaps with the time when the first subscription 402 performs idle mode wakeups 404-*a* and 404-*b*, respectively. Because both subscriptions share the same network operator and base station and the idle mode wakeups overlap, the network information obtained by the first subscription 402 would be the same as the network information obtained by the second subscription 410. Additionally, the idle mode operations 406-*a* and 406-*b* performed by the first subscription 402 would produce the same results as the idle mode operations performed by the second subscription 410. In this situation, in various embodiments, the second subscription 410 does not perform the idle mode wakeups 412-*a* and 412-*b*, and does not independently perform any idle mode operations. Instead, the second subscription 410 accesses the results of the idle mode operations 406-*a* and 406-*b* conducted by the first subscription 402 that are stored in the memory, shown as arrows 408-*a* and 408-*b*, and uses those results for performing the idle mode operations for the second subscription 410. This allows the second subscription 410 to maintain the idle mode status and synchronization with the network. In other words, the first subscription 402 performs all of the idle mode activities for both subscriptions, and shares the results of those activities with the second subscription 410. In this manner, the second subscription 410 does not have to perform duplicative idle mode activities and thus reduces the burden on the resources of the multi-SIM mobile communication device.

FIG. 5 shows a timing diagram 500 for a multi-SIM mobile communication device with a first subscription 502 in the idle mode and a second subscription 510 in the idle mode in which both subscriptions share the same network operator and base station. With reference to FIGS. 1, 2, 4, and 5, in the example illustrated in the timing diagram 500, the first subscription 502 wakes up from idle mode before the second subscription 510. The first subscription 502 performs idle mode wakeup 504-*a* while in the idle mode, and acquires network information from the base station during the idle mode wakeup 504-*a*. The first subscription 502 then performs idle mode operations 506-*a* after acquiring the network information. The first subscription 502 then remains idle during the next DRx cycle, and performs another idle mode wakeup 504-*b* at the end of the DRx cycle to obtain network information from the base station. The first subscription then performs idle mode operations 506-*b* before going back into a DRx cycle. The network information may be stored in memory on the multi-SIM mobile communication device (e.g., 200) that is accessible by both subscriptions, for example the memory 214. Additionally, the results of the idle mode operations 506-*a* and 506-*b* may also be stored in memory accessible by both subscriptions.

The second subscription 510 is scheduled to perform idle mode wakeups 512-*a* and 512-*b*, which occurs after but does not overlap the idle mode wakeups 504-*a* and 504-*b*, respectively, of the first subscription 502. Because both subscriptions share the same network operator and base station, the network information obtained by the first subscription 502 would be the same as the network information obtained by the second subscription 510. In this situation in the various embodiments, the second subscription 510 does not perform the idle mode wakeups 512-*a* and 512-*b*. Instead, the second subscription 510 accesses the network information acquired by the first subscription 510 and stored in the shared memory, shown as arrows 508-*a* and 508-*b*. The second subscription 510 utilizes the network information to conduct idle mode operations 514-*a* and 514-*b*. Because the idle mode wakeups for both subscriptions do not overlap in time, any time dependent idle mode operations would give different results for each subscription, even if the other network information is the same. Therefore, in this situation the second subscription 510 may optionally access the shared memory for the results of idle mode operations stored by the first subscription 502 for idle mode operations that are not time dependent. In summary, the first subscription 502 performs the idle mode wakeup and network information acquisition for both subscriptions, and shares the network information with the second subscription 510. The second subscription 510 may then conduct idle mode operations using the network information, and may optionally utilize one or more results of the idle mode operations of the first subscription 502. In this manner, the second subscription 510 does not have to perform duplicative idle mode wakeup and thus reduces the burden on the resources of the multi-SIM mobile communication device.

Figure 6:
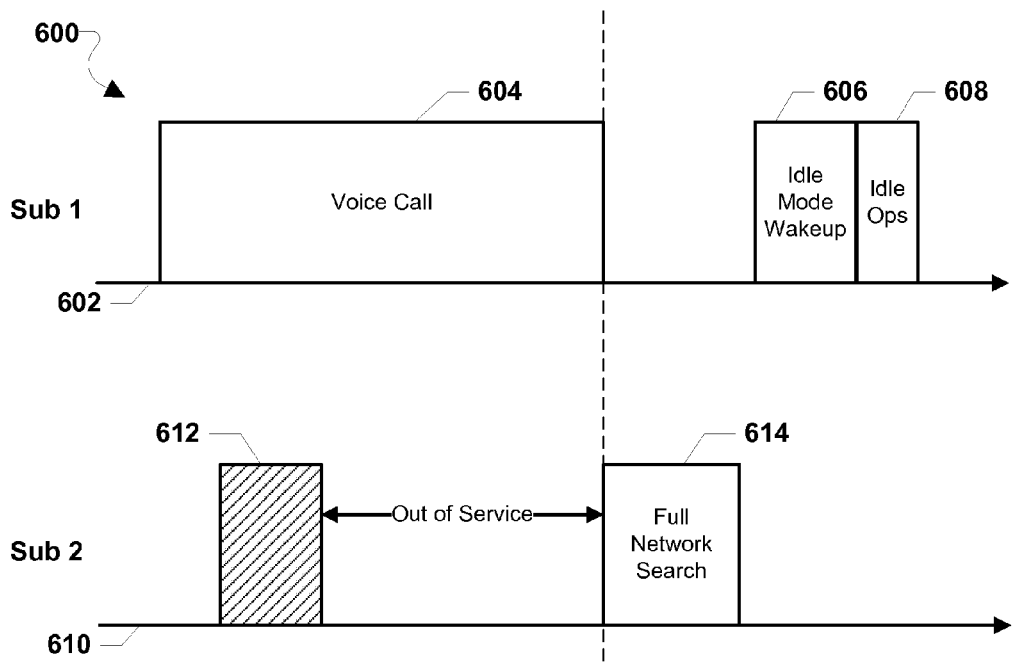
FIG. 6 is a timing diagram illustrating regular idle mode operations when one subscription is in a voice call and the other subscription is in the idle mode in a multi-SIM mobile communication device.

The dual idle mode operation of both subscriptions described in the timing diagrams 400 and 500 may be interrupted when one subscription becomes active, either in a voice call or a data communication. FIG. 6 shows a timing diagram 600 for a multi-SIM mobile communication device with a first subscription 602 in a voice call and a second subscription 610 in the idle mode in which both subscriptions share the same network operator and base station. With reference to FIGS. 1-6, both subscriptions may have previously been in the idle mode (as in FIGS. 4-5), but now the first subscription 602 has initiated or received a circuit switched voice call 604. During the voice call 604 on the first subscription 602, the second subscription 610 is scheduled to perform an idle mode wakeup 612 to connect with the network and receive network information. However, because the voice call 604 has a higher priority and uses the entire bandwidth signal of the shared RF resource of the multi-SIM mobile communication device, the second subscription 610 cannot perform the idle mode wakeup 612. This means the second subscription 610 could lose synchronization with the network and go out-of-service for the duration of the voice call 604.

Once the voice call 604 ends, the first subscription 602 reverts to the idle mode and conducts idle mode wakeup 606 and idle mode operations 608 according to the DRx cycle of the network supporting the first subscription. Conventionally, the second subscription 614 would need to conduct a full network search 614 to find and synchronize with the network operator supporting the second subscription and the base station that the second subscription is camped on. The full network search 614 may consume a large amount of device resources (e.g., CPU time, memory, battery power).

Figure 7:
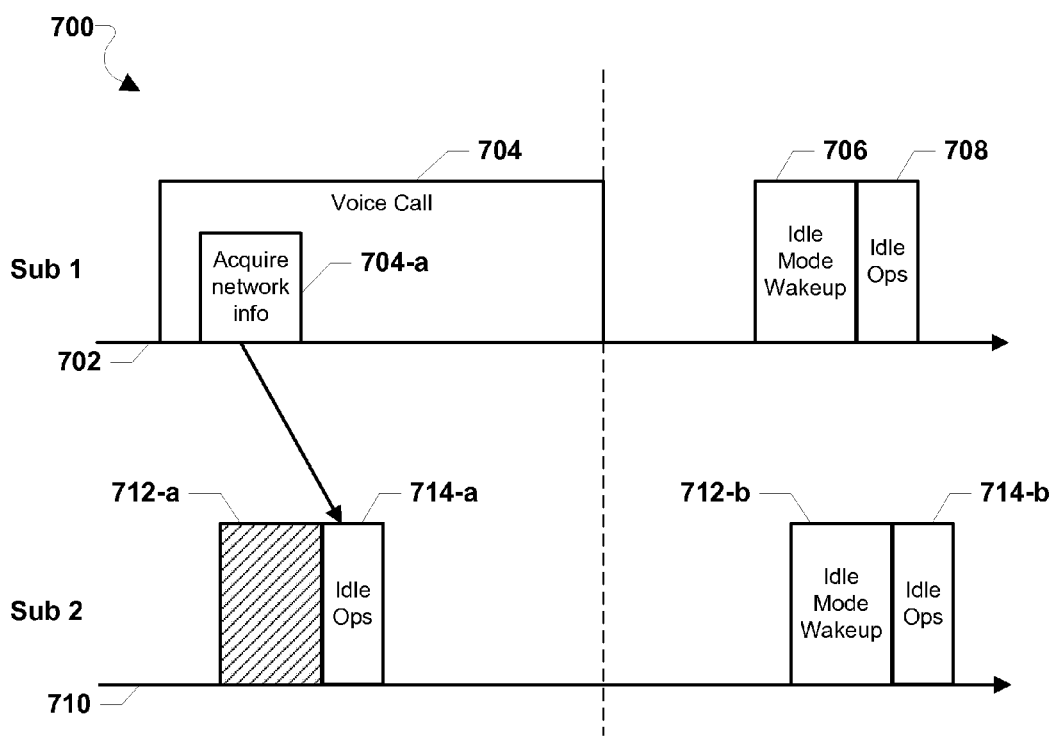
FIG. 7 is a timing diagram illustrating improved idle mode operations when one subscription is in a voice call and the other subscription is in the idle mode according to various embodiments.

FIG. 7 shows a timing diagram 700 for a multi-SIM mobile communication device with a first subscription 702 in a voice call and a second subscription 710 in the idle mode in which both subscriptions share the same network operator and base station and network information obtained during the voice call is stored in a shared memory so that the network information can be used by the second subscription 710 to prevent the second subscription from going out-of-service. With reference to FIGS. 1-7, both subscriptions may have previously been in the idle mode (as in FIGS. 4-5), but the first subscription 702 has initiated or received a circuit switched voice call 704. During the voice call 704 on the first subscription 702, the second subscription 710 is scheduled to perform an idle mode wakeup 712-a, but cannot complete an idle mode wakeup because the voice call 704 has priority and thus is using the RF resource. While the idle mode wakeup 712-a is not performed, in various embodiments, the first subscription 702 may acquire network information from the network in block 704-a and store the network information in memory (e.g., the memory 214) that is accessible by the second subscription 710. The network information may include sample values acquired during the voice call 704 that are stored on a static RAM (SRAM) accessible by the second subscription 710.

The second subscription 710 may utilize the network information acquired by the first subscription 702 and stored in the shared memory to perform idle mode operations 714-a. This allows the second subscription 710 to remain synchronized with the network and avoid an out-of-service status. The idle mode operations 714-a may optionally not include inter-frequency measurements as the second subscription 710 will follow the inter-frequency measurement decisions of the first subscription 702. As long as the voice call 704 persists, the first subscription 702 may acquire network information from the network supporting the first subscription 702, and the second subscription 710 may perform scheduled idle mode operations at the end of each DRx cycle without having to perform any idle mode wakeups. If the second subscription 710 receives a page for a voice call, the second subscription will not respond because the voice call 704 on the first subscription 702 is already underway. When the voice call 704 ends, the first subscription 702 reverts to the idle mode. At that point, both subscriptions are in the idle mode and the idle mode behavior described with reference to the timing diagrams 400 and 500 may occur in which one subscription performs the idle mode wakeup and idle mode operations and shares the results with the other subscription.

Figure 8:
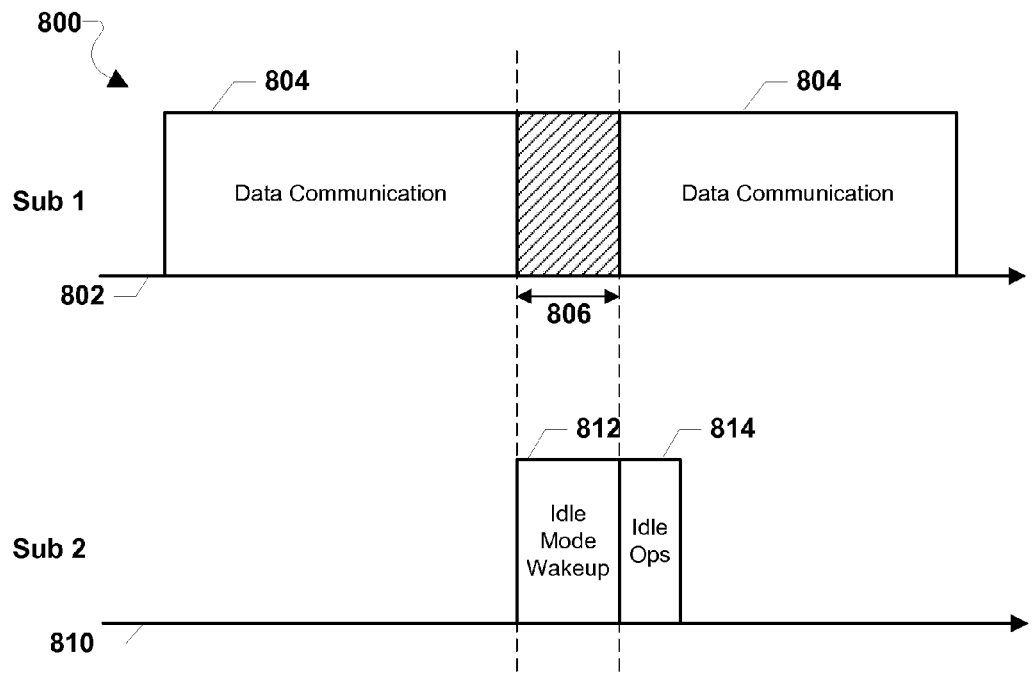
FIG. 8 is a timing diagram illustrating regular idle mode operations when one subscription is in data communication and the other subscription is in the idle mode in a multi-SIM mobile communication device.

FIG. 8 shows a timing diagram 800 for a multi-SIM mobile communication device with a first subscription 802 in data communication and a second subscription 810 in the idle mode in which both subscriptions share the same network operator and base station. With reference to FIGS. 1-8, both subscriptions may have previously been in the idle mode (as in FIGS. 4-5), or one subscription may have finished a voice call (as in FIG. 7), but now the first subscription 602 has initiated or received data communication, shown as data communication 804. During the data communication 804 on the first subscription 802, the second subscription 810 is scheduled to perform an idle mode wakeup 812 to connect with the network and receive network information. In order for the second subscription 810 to perform the idle mode wakeup 812, the RF resource of the multi-SIM mobile communication device performs a tune-away 806 from the first subscription 802 to give the second subscription 810 enough bandwidth. However, this means that the data communication 804 is interrupted during the length of the tune-away 806. This may result in the loss or degradation of data in the data communication 804.

Figure 9:
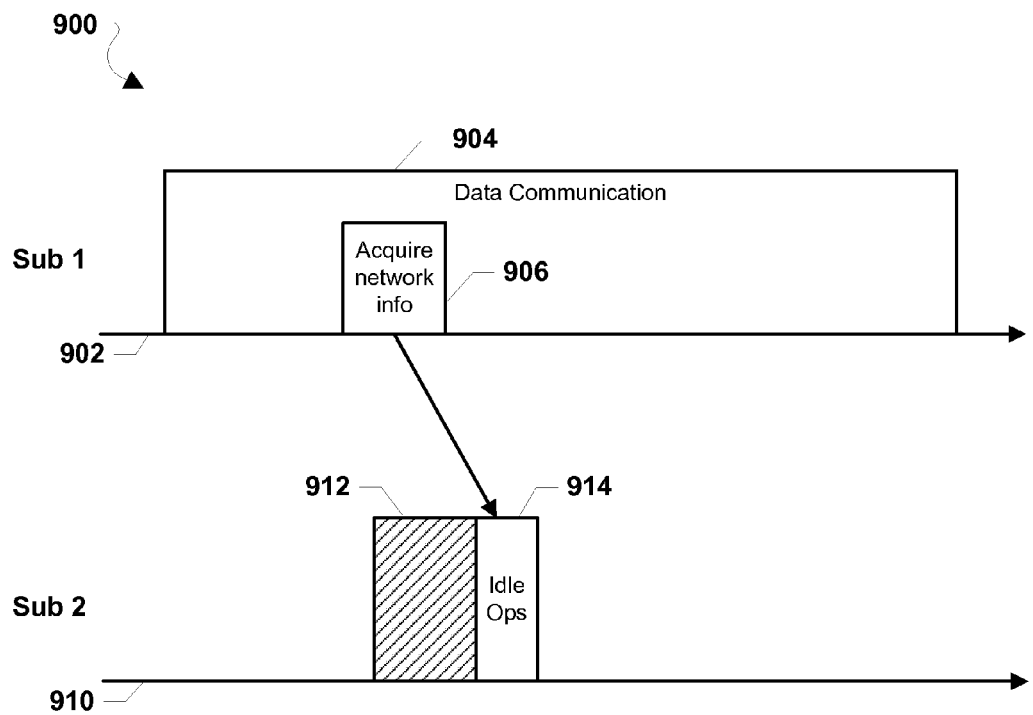
FIG. 9 is a timing diagram illustrating improved idle mode operations when one subscription is in data communication and the other subscription is in the idle mode according to various embodiments.

FIG. 9 shows a timing diagram 900 for a multi-SIM mobile communication device with a first subscription 902 in data communication and a second subscription 910 in the idle mode in which both subscriptions share the same network operator and base station in order to enable the second subscription 910 to carry out idle mode activities without resorting to tune-aways. With reference to FIGS. 1-9, both subscriptions may have previously been in the idle mode (as in FIGS. 4-5), or one subscription may have been in a voice call (as in FIG. 7), but now the first subscription 902 has initiated or received data communication, shown as a data communication 904. During data communication on the first subscription 902, the second subscription 910 is scheduled to perform an idle mode wakeup 912 to connect with the network and receive network information. Because the first subscription 902 is already in communication with the network, in the various embodiments the idle mode wakeup 912 is not performed and there is no tune-away from the first subscription 902. Instead, the first subscription 902 may acquire network information from the network at block 906 and store the network information in memory (e.g., memory 214) that is accessible by the second subscription 910. The network information may include sample values acquired during the data communication 904 that are stored on a static RAM (SRAM) accessible by the second subscription 910.

The second subscription 910 may then utilize the network information acquired by the first subscription 902 to perform idle mode operations 914. This allows the second subscription 910 to remain synchronized with the network while avoiding performing a tune-away that may degrade the data communication 904. As long as the data communication 904 persists, the first subscription 902 may acquire network information from the network, and the second subscription 910 may perform scheduled idle mode operations at the end of each DRx cycle without having to perform idle mode wakeups. If the second subscription 910 receives a page for a voice call, the second subscription 910 will become the active subscription and the first subscription 902 will become the idle subscription for the duration of the call, a situation described with reference to the timing diagram 700. Once the voice call ends, the subscriptions revert to original roles and the data communication 904 resumes. When the data communication 904 ends, the first subscription 902 reverts to idle mode. At that point, both subscriptions will be in the idle mode and the idle mode behavior as described in the timing diagrams 400 and 500 may commence in which one subscription performs the idle mode wakeup and idle mode operations and shares the results with the other subscription via a shared memory.

Figure 11:
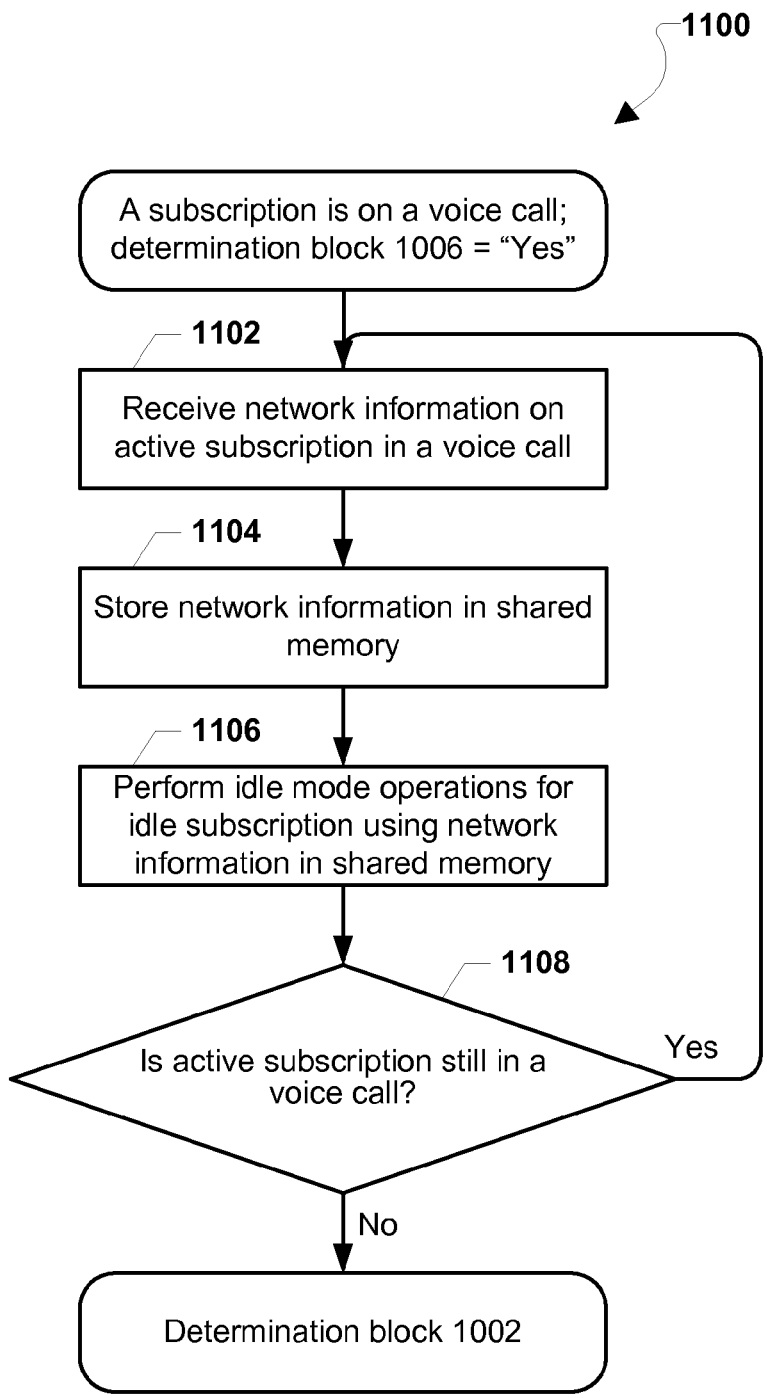
FIG. 11 is a process flow diagram illustrating a method for performing idle mode operations on a multi-SIM mobile communication device when one subscription is in a voice call according to various embodiments.
Figure 12:
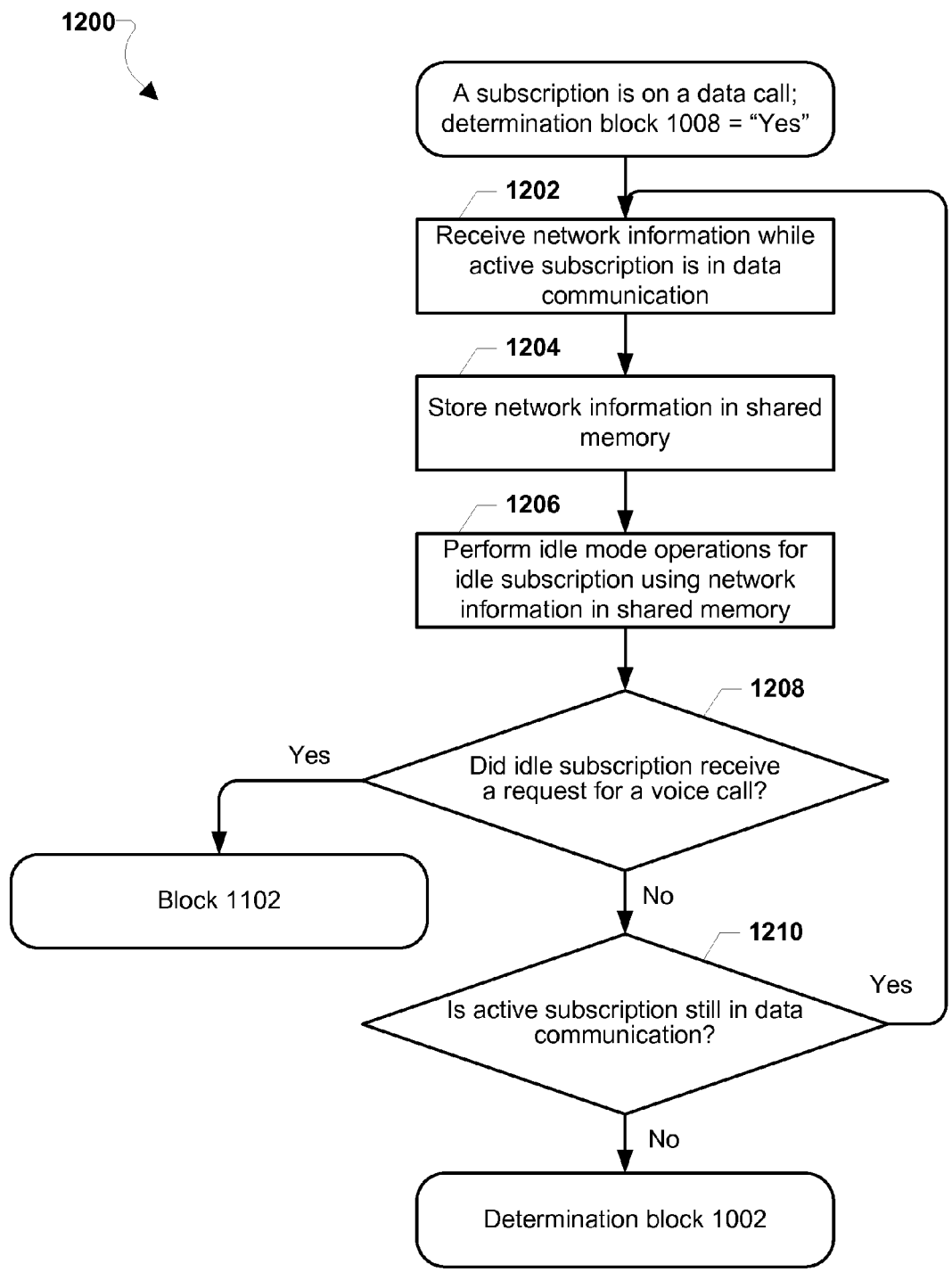
FIG. 12 is a process flow diagram illustrating a method for performing idle mode operations on a multi-SIM mobile communication device when one subscription is in data communication according to various embodiments.

As can be seen with reference to FIGS. 4, 5, 7, and 9, when multiple subscriptions active in a multi-SIM mobile communication device share the same network operator and base station, idle mode activities of the subscriptions may be improved by sharing information between them. Methods for accomplishing this are illustrated in FIGS. 10-12 according to various embodiments.

Figure 10:
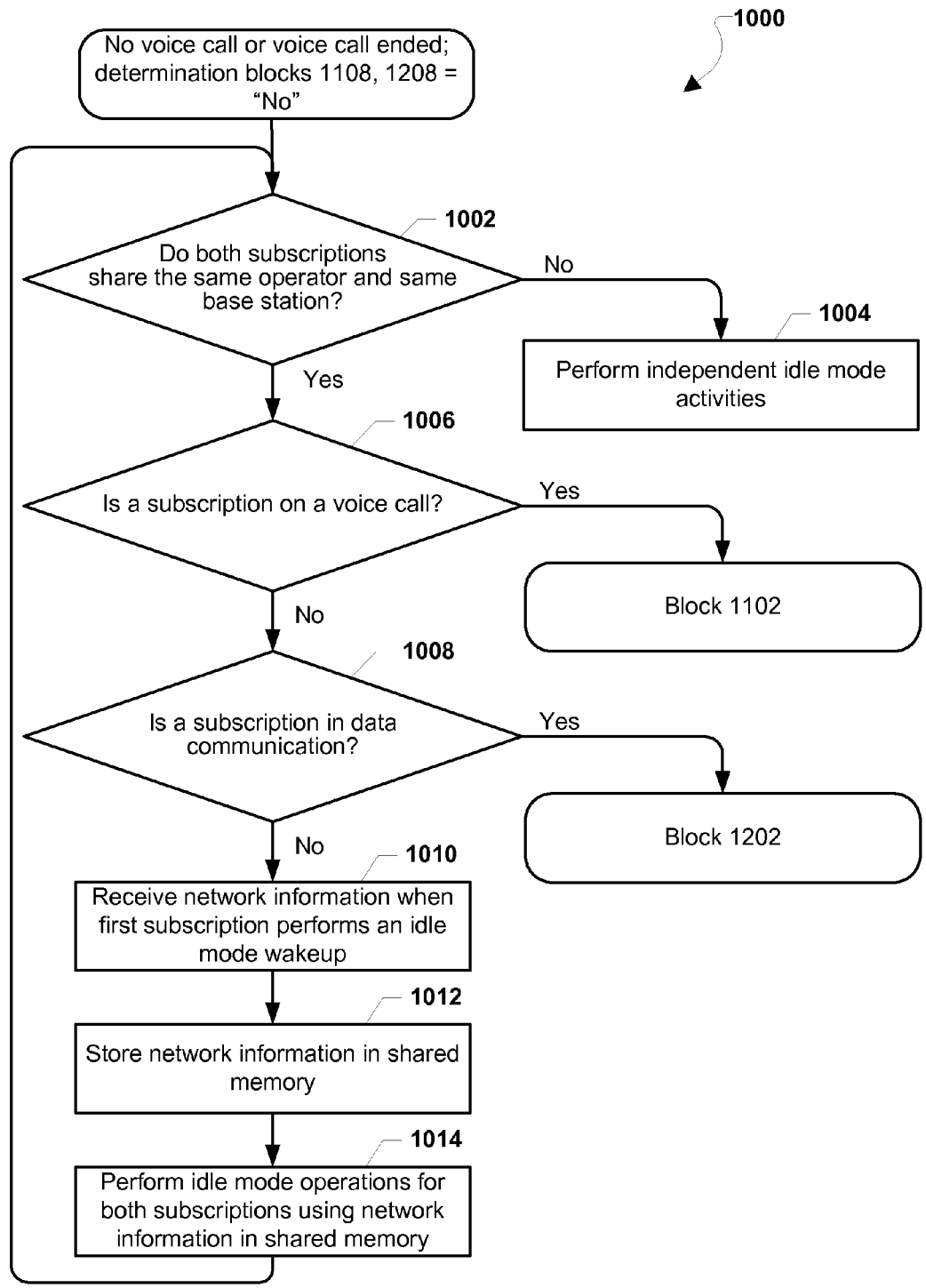
FIG. 10 is a process flow diagram illustrating a method for performing idle mode operations on a multi-SIM mobile communication device when both subscriptions are in the idle mode according to various embodiments.

FIG. 10 illustrates a method 1000 for performing idle mode operations on a mobile communication device with two subscriptions in the idle mode according to various embodiments. With reference to FIGS. 1, 2, 4, 5, 7, 9, and 10, the method 1000 may be implemented with a processor (e.g., the general processor 206, the baseband modem processor 216, a separate controller, and/or the like) of a mobile communication device (such as the multi-SIM mobile communication devices 110, 200) that supports two or more subscriptions sharing a RF resource. The subscriptions may belong to the same RAT. For example, the mobile communication device may be a DSDS device and both subscriptions are WCDMA subscriptions. Although the method 1000 is discussed in relation to a mobile communication device with two subscriptions, the method 1000 is extendable to any number of subscriptions in a multi-SIM multi-standby (MSMS) device.

In determination block 1002, the device processor may determine whether a first and second subscription in the mobile communication device share the same network operator and base station. Each subscription may have obtained network identifier information from each subscription's respective network that identifies the network operator and base station that each subscription is currently using. Examples of such network identifier information includes one or more of an international mobile subscriber identity (IMSI), a temporary mobile subscriber identity (TMSI), a public land mobile network (PLMN) identifier, and an absolute radio frequency channel number (ARFCN). The processor may compare the network identifier information of the first subscription and second subscription to determine whether they currently share the same network operator and base station.

In response to determining that both subscriptions do not share the same network operator or the same base station (i.e., determination block 1002="No"), the device processor may independently perform idle mode activities for each subscription in block 1004. That is, while each subscription is in the idle mode, each subscription will perform an idle mode wakeup and idle mode operations according to each subscription's respective DRx cycle.

In response to determining that both subscriptions share the same network operator and the same base station (i.e., determination block 1002="Yes"), the device processor may determine whether one of the subscriptions is in a voice call in determination block 1006. The device processor may check the paging information for each subscription or other indicators that indicates whether one of the subscriptions is in a circuit switched call.

In response to determining that a subscription is in a voice call (i.e., determination block 1006="Yes"), the processor may perform operations of method 1100 (see FIG. 11).

In response to determining that none of the subscriptions is in a voice call (i.e., determination block 1006="No"), the device processor may determine whether one of the subscriptions is in data communication in determination block 1008. In response to determining that one subscription is in data communication (i.e., determination block 1008="Yes"), the processor may perform operations of method 1200 (see FIG. 12).

In response to determining that none of the subscriptions is in data communication (i.e., determination block 1008="No"), the device processor may receive network information from the network via the base station when a first subscription performs an idle mode wakeup in block 1010. The first subscription may have been scheduled to wake up from idle mode earlier than the second subscription. For example, each subscription may have different DRx cycle periods in the idle mode and may wake up at different points in time. The device processor may select the subscription that is scheduled to wake up next to perform the idle mode wakeup. During the idle mode wakeup, the first subscription receives network information from the base station. The network information may include, but is not limited to, system information blocks, sample RAM values, and neighbor cell measurements.

In block 1012, the device processor may store the network information in shared memory that is accessible to both subscriptions. For example, the network information may be stored in the memory 214, which may be a static RAM (SRAM). In block 1014, the device processor (or a processor supporting each subscription) may perform idle mode operations for both subscriptions using the network information stored in the shared memory. In other words, the second subscription may not perform any idle mode wakeup because the first subscription has already performed the idle mode wakeup and received the network information, which is applicable to both subscriptions. The idle mode operations may be performed independently for both subscriptions when the scheduled idle mode wakeups for both subscriptions do not overlap. Alternatively, the device processor may perform a single set of idle mode operations and apply the results to both subscriptions when the scheduled idle mode wakeups for both subscriptions overlap. Some idle mode operations may be time dependent, so when the idle mode wakeups for both subscriptions do not overlap, some of the results of the idle mode operations may be different. However, the second subscription may still use one or more results of idle mode operations completed by the first subscription that are not time dependent.

Idle mode operations may include, but are not limited to, reception automatic gain control computations, cell reacquisition operations, finger triage operations, quick finger tracking or quick time tracking operations, equalizer weight computations, page indicator channel monitoring operations, selection criteria and reselection criteria evaluations, inter- and intra-frequency neighbor measurements, decoding of system information blocks, antenna switch diversity algorithms, and idle diversity operations.

Once the device processor performs the idle mode operations for both subscriptions, the device processor may determine whether the same idle mode conditions exist while the processor waits for the next scheduled idle mode wakeup for the first subscription (i.e., the device processor loops back to determination block 1002). In other words, between successive idle mode wakeups, the device processor determines again whether both subscriptions still share the same network operator and base station, and whether one subscription is on a voice call or in data communication. If one subscription begins a voice call or data communication, the device processor may perform operations of the methods 1100 and 1200 (see FIGS. 11 and 12, respectively). In this manner, the method 1000 provides for improved idle mode operations when both subscriptions in a mobile communication device are idle and share the same network operator and base station.

FIG. 11 illustrates the method 1100 for performing idle mode operations on a mobile communication device in which one subscription is in an active voice call and the other subscription is in the idle mode according to various embodiments. With reference to FIGS. 1, 2, 4, 5, 7, and 9-11, the method 1100 may be implemented with a processor (e.g., the general processor 206, the baseband modem processor 216, a separate controller, and/or the like) of a mobile communication device (such as the multi-SIM mobile communication devices 110, 200) that supports two or more subscriptions sharing a RF resource. The subscriptions may belong to the same RAT. For example, the mobile communication device may be a DSDS device and both subscriptions are WCDMA subscriptions. Although the method 1100 is described with reference to a mobile communication device with two subscriptions, the method 1100 is extendable to any number of subscriptions in a MSMS device.

The device processor may perform the method 1100 upon determining that one subscription in the mobile communication device has begun a voice call (i.e., determination block 1006 in FIG. 10="Yes"). In block 1102, the device processor may receive network information from the network via the base station during the voice call on the active subscription. In some embodiments, the network information may be received continuously from the network during the voice call, or may be received periodically (e.g., timed to coincide with the end of DRx cycles of the idle subscription). The network information may include sample values stored in a shared memory (e.g., an SRAM) on the mobile communication device.

In block 1104, the device processor may store the network information in shared memory that is accessible to both subscriptions. For example, the network information may be stored in the memory 214. In block 1106, the device processor may perform idle mode operations for the idle subscription using the network information stored in the shared memory. In other words, the idle subscription does not wake up from the idle mode, and the device processor may perform the idle mode operations for the idle subscription using the network information obtained by the active subscription. This allows the idle subscription to remain synchronized with the network and avoid an out-of-service state. If the idle subscription receives a page for a voice call, the idle subscription will ignore the page as the active subscription is already in a voice call.

The device processor may determine whether the active subscription is still in a voice call in determination block 1108. In response to determining that the active subscription is still in a voice call (i.e., determination block 1108="Yes"), the device processor may then receive more network information using the active subscription in block 1102. In other words, as long as the active subscription is in the voice call, the device processor may use the network information obtained by the active subscription to perform the idle mode operations for the idle subscription.

In response to determining that the active subscription is not in a voice call (i.e., determination block 1108="No"), both subscriptions are idle and the device processor may perform operations of the method 1000 for dual idle mode subscriptions by again determining whether both subscriptions share the same operator and base station in block 1002 as described. In this manner, the method 1100 provides for improved idle mode operations in a mobile communication device when one subscription is in an active voice call and the other subscription is idle, and both share the same network operator and base station.

FIG. 12 illustrates the method 1200 for performing idle mode operations on a mobile communication device in which one subscription is in active data communication and the other subscription is in the idle mode according to various embodiments. With reference to FIGS. 1, 2, 4, 5, 7, and 9-12, the method 1200 may be implemented with a processor (e.g., the general processor 206, the baseband modem processor 216, a separate controller, and/or the like) of a mobile communication device (such as the multi-SIM mobile communication devices 110, 200) that supports two or more subscriptions sharing an RF resource. The subscriptions may belong to the same RAT. For example, the mobile communication device may be a DSDS device and both subscriptions are WCDMA subscriptions. Although the method 1200 is described with reference to a mobile communication device with two subscriptions, the method 1200 is extendable to any number of subscriptions in a MSMS device.

The device processor may perform the method 1200 upon determining that one subscription in the mobile communication device has begun data communications (i.e., determination block 1008 in FIG. 10="Yes"). In block 1202, the device processor may receive network information from the network via the base station during the data communication on the active subscription. The network information may be received continuously from the network during the data communication, or may be received periodically (e.g., timed to coincide with the end of DRx cycles of the idle subscription). The network information may include sample values stored in an SRAM on the mobile communication device.

In block 1204, the device processor may store the network information in a shared memory that is accessible to both subscriptions. For example, the network information may be stored in memory 214 that may be a SRAM. In block 1206, the device processor may perform idle mode operations for the idle subscription using the network information stored in shared memory. In other words, the idle subscription does not wake up from the idle mode, and the device processor may perform the idle mode operations for the idle subscription using the network information obtained by the active subscription. This avoids having the mobile communication device initiate a tune-away from the active subscription to the idle subscription to perform an idle mode wakeup, which preserves the integrity of the data communication.

The device processor may determine whether the idle subscription has received a request for a voice call in determination block 1208. For example, the network information may contain paging information notifying the mobile communication device about an incoming voice call on the idle subscription. In response to determining that the idle subscription received a request for a voice call (i.e., determination block 1208="Yes"), the device processor may perform operations of the method 1100 such as by receiving network information the active subscription in block 1102 when the idle subscription becomes the active subscription and vise versa.

In response to determining that the idle subscription did not receive a request for a voice call (i.e., determination block 1208="No"), the device processor may determine whether the active subscription is still in data communication in determination block 1210. In response to determining that the active subscription is still in data communication (i.e., determination block 1210="Yes"), the device processor may receive more network information using the active subscription in block 1202. In other words, as long as the active subscription is in data communication, the device processor may use the network information obtained by the active subscription to perform the idle mode operations for the idle subscription.

In response to determining that the active subscription is no longer in data communication (i.e., determination block 1210="No"), both subscriptions are in the idle mode and the device processor may perform operations of the method 1000 for dual idle mode subscriptions by again determining whether both subscriptions share the same operator and base station in block 1002 as described. In this manner, the method 1200 provides for improved idle mode operations in a mobile communication device when one subscription is in active data communication and the other subscription is idle, and both share the same network operator and base station.

Figure 13:
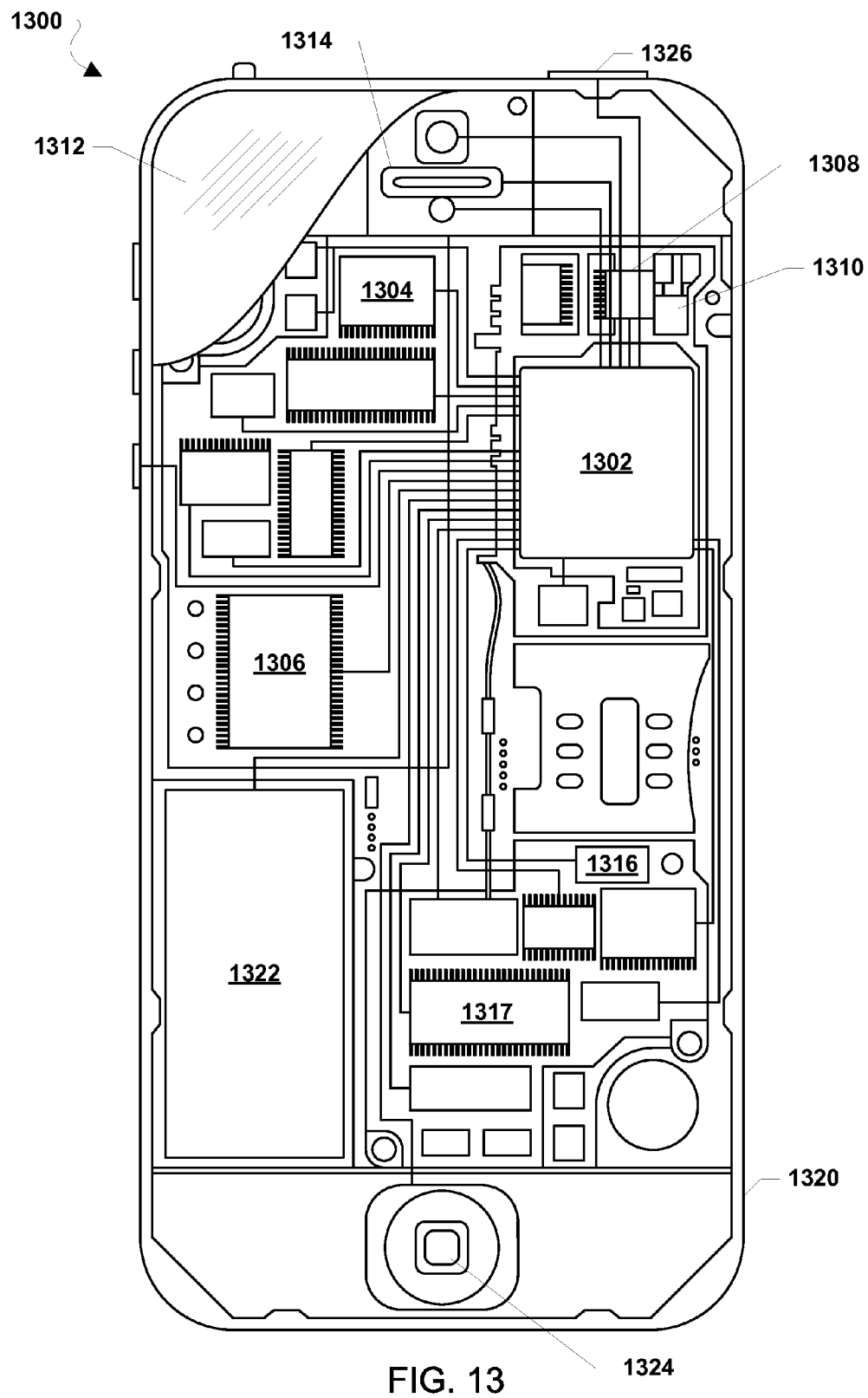
FIG. 13 is a component block diagram of a mobile communication device suitable for implementing some embodiment methods.

Various embodiments may be implemented in any of a variety of multi-SIM mobile communication devices, an example of which (e.g., multi-SIM mobile communication device 1300) is illustrated in FIG. 13. With reference to FIGS. 1, 2, 4, 5, 7, and 9-13, the multi-SIM mobile communication device 1300 may be similar to the multi-SIM mobile communication devices 110, 120, 200 as described. As such, the multi-SIM mobile communication device 1300 may implement the methods 1000, 1100, and 1200 according to the various embodiments.

The multi-SIM mobile communication device 1300 may include a processor 1302 coupled to a touchscreen controller 1304 and an internal memory 1306. The processor 1302 may be one or more multi-core integrated circuits designated for general or specific processing tasks. The internal memory 1306 may be volatile or non-volatile memory, and may also be secure and/or encrypted memory, or unsecure and/or unencrypted memory, or any combination thereof. The touchscreen controller 1304 and the processor 1302 may also be coupled to a touchscreen panel 1312, such as a resistive-sensing touchscreen, capacitive-sensing touchscreen, infrared sensing touchscreen, etc. Additionally, the display of the multi-SIM mobile communication device 1300 need not have touch screen capability.

The multi-SIM mobile communication device 1300 may have a cellular network transceiver 1308 coupled to the processor 1302 and to an antenna 1310 and configured for sending and receiving cellular communications. The transceiver 1308 and the antenna 1310 may be used with the above-mentioned circuitry to implement various embodiment methods. The multi-SIM mobile communication device 1300 may include one or more SIM cards 1616 coupled to the transceiver 1308 and/or the processor 1302 and may be configured as described above. The multi-SIM mobile communication device 1300 may include a cellular network wireless modem chip 1317 that enables communication via a cellular network and is coupled to the processor.

The multi-SIM mobile communication device 1300 may also include speakers 1314 for providing audio outputs. The multi-SIM mobile communication device 1300 may also include a housing 1320, constructed of a plastic, metal, or a combination of materials, for containing all or some of the components discussed herein. The multi-SIM mobile communication device 1300 may include a power source 1322 coupled to the processor 1302, such as a disposable or rechargeable battery. The rechargeable battery may also be coupled to the peripheral device connection port to receive a charging current from a source external to the multi-SIM mobile communication device 1300. The multi-SIM mobile communication device 1300 may also include a physical button 1324 for receiving user inputs. The multi-SIM mobile communication device 1300 may also include a power button 1326 for turning the multi-SIM mobile communication device 1300 on and off.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configurations. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to some embodiments without departing from the spirit or scope of the written description. Thus, the present disclosure is not intended to be limited to the embodiments shown herein but is to be accorded the widest scope consistent with the following claims and the principles and novel features disclosed herein.

What is claimed is:

1. A method for performing idle mode operations on a mobile communication device, comprising:
   determining whether a first subscription and a second subscription share a network operator and are camped on a same base station;
   receiving network information from the base station using the first subscription when the first subscription is in a voice call and the second subscription is in an idle mode;
   storing the network information in a shared memory of the mobile communication device in response to determining that the first subscription and the second subscription share a network operator and are camped on the same base station; and
   performing idle mode operations for the second subscription using the network information stored in the shared memory.

2. The method of claim 1, wherein the first subscription and the second subscription are both Wideband Code Division Multiple Access (WCDMA) subscriptions.

3. The method of claim 1, wherein the network information includes at least one of a system information block, a sample random access memory (RAM) value, and a neighbor cell measurement.

4. The method of claim 1, wherein the idle mode operations include at least one of a reception automatic gain control computation, a cell reacquisition operation, a finger triage operation, a quick finger tracking operation, a quick time tracking operation, an equalizer weight computation, a page indicator channel monitoring operation, a selection criteria evaluation, a reselection criteria evaluation, an inter-frequency neighbor measurement, an intra-frequency neighbor measurement, a decoding of a system information block, an antenna switch diversity algorithm, and an idle diversity operation.

5. The method of claim 1, further comprising:
   setting, in response to determining the first subscription and the second subscription do not share the same network operator or are camped on different base stations, an out-of-service status on the second subscription.

6. The method of claim 1, wherein determining whether the first subscription and the second subscription share the same network operator and are camped on a same base station comprises comparing network identifier information of the first subscription with network identifier information of the second subscription.

7. The method of claim 6, wherein the network identifier information includes at least one of an international mobile subscriber identity, a temporary mobile subscriber identity, a public land mobile network identifier, and an absolute radio frequency channel number.

8. The method of claim 1, wherein the shared memory includes a static random access memory.

9. A multi-subscriber identification module (SIM) mobile communication device, comprising:
   a radio frequency (RF) resource;
   a memory; and
   a processor coupled to the RF resource and the memory, configured to connect to a first SIM associated with a first subscription and a second SIM associated with a second subscription, and configured with processor-executable instructions to:
   determine whether the first subscription and the second subscription share a network operator and are camped on a same base station;
   receive network information from the base station using the first subscription when the first subscription is in a voice call and the second subscription is in an idle mode;
   store the network information in the memory of the multi-SIM mobile communication device in response to determining that the first subscription and the second subscription share a network operator and are camped on the same base station; and
   perform idle mode operations for the second subscription using the network information stored in the memory.

10. The multi-SIM mobile communication device of claim 9, wherein the first subscription and the second subscription are both Wideband Code Division Multiple Access (WCDMA) subscriptions.

11. The multi-SIM mobile communication device of claim 9, wherein the network information includes at least one of a system information block, a sample Random Access Memory (RAM) value, and a neighbor cell measurement.

12. The multi-SIM mobile communication device of claim 9, wherein the idle mode operations include at least one of a reception automatic gain control computation, a cell reacquisition operation, a finger triage operation, a quick finger tracking operation, a quick time tracking operation, an equalizer weight computation, a page indicator channel monitoring operation, a selection criteria evaluation, a reselection criteria evaluation, an inter-frequency neighbor measurement, an intra-frequency neighbor measurement, a decoding of a system information block, an antenna switch diversity algorithm, and an idle diversity operation.

13. The multi-SIM mobile communication device of claim 9, wherein the processor is further configured with processor-executable instructions to set an out-of-service status on the second subscription in response to determining the first subscription and the second subscription do not share the same network operator or are camped on different base stations.

14. The multi-SIM mobile communication device of claim 9, wherein the processor is further configured with processor-executable instructions to determine whether the first subscription and the second subscription share the same network operator and are camped on a same base station by comparing network identifier information of the first subscription with network identifier information of the second subscription.

15. The multi-SIM mobile communication device of claim 14, wherein the network identifier information includes at least one of an international mobile subscriber identity, a temporary mobile subscriber identity, a public land mobile network identifier, and an absolute radio frequency channel number.

16. The multi-SIM mobile communication device of claim 9, wherein the memory comprises a static random access memory.

17. A multi-subscriber identification module (SIM) mobile communication device, comprising:
    means for determining whether a first subscription and a second subscription share a network operator and are camped on a same base station;
    means for receiving network information from the base station using the first subscription when the first subscription is in a voice call and the second subscription is in an idle mode;
    means for storing the network information in a shared memory of the multi-SIM mobile communication device in response to determining that the first subscription and the second subscription share a network operator and are camped on the same base station; and
    means for performing idle mode operations for the second subscription using the network information stored in the shared memory.

18. A non-transitory processor-readable medium having stored thereon processor-executable instructions configure to cause a processor of a multi-subscriber identification module (SIM) mobile communication device to perform operations comprising:
    determining whether a first subscription and a second subscription share a network operator and are camped on a same base station;
    receiving network information from the base station using the first subscription when the first subscription is in a voice call and the second subscription is in an idle mode;
    storing the network information in a shared memory of the multi-SIM mobile communication device in response to determining that the first subscription and the second subscription share a network operator and are camped on the same base station; and
    performing idle mode operations for the second subscription using the network information stored in the shared memory.

19. The non-transitory processor-readable medium of claim 18, wherein the first subscription and the second subscription are both Wideband Code Division Multiple Access (WCDMA) subscriptions.

20. The non-transitory processor-readable medium of claim 18, wherein the network information includes at least one of a system information block, a sample Random Access Memory (RAM) value, and a neighbor cell measurement.

21. The non-transitory processor-readable medium of claim 18, wherein the idle mode operations include at least one of a reception automatic gain control computation, a cell reacquisition operation, a finger triage operation, a quick finger tracking operation, a quick time tracking operation, an equalizer weight computation, a page indicator channel monitoring operation, a selection criteria evaluation, a reselection criteria evaluation, an inter-frequency neighbor measurement, an intra-frequency neighbor measurement, a decoding of a system information block, an antenna switch diversity algorithm, and an idle diversity operation.

22. The non-transitory processor-readable medium of claim 18, wherein the stored processor-executable instructions are configure to cause the processor of the multi-SIM mobile communication device to perform operations further comprising setting, in response to determining the first subscription and the second subscription do not share the same network operator or are camped on different base stations, an out-of-service status on the second subscription.

23. The non-transitory processor-readable medium of claim 18, wherein the stored processor-executable instructions are configure to cause the processor of the multi-SIM mobile communication device to perform operations such that determining whether the first subscription and the second subscription share the same network operator and are camped on a same base station comprises comparing network identifier information of the first subscription with network identifier information of the second subscription.

24. The non-transitory processor-readable medium of claim 23, wherein the network identifier information includes at least one of an international mobile subscriber identity, a temporary mobile subscriber identity, a public land mobile network identifier, and an absolute radio frequency channel number.

25. The non-transitory processor-readable medium of claim 18, wherein the shared memory includes a static random access memory.

* * * * *